Nov. 17, 1964  D. E. S. GOTWALD, JR., ETAL  3,157,384
HIGH SPEED TOOL

Original Filed May 20, 1960

INVENTORS
DAVID E.S. GOTWALD, JR.
CARL J. MUNCHEL
BY
ATTORNEY

Nov. 17, 1964  D. E. S. GOTWALD, JR., ETAL  3,157,384
HIGH SPEED TOOL
Original Filed May 20, 1960  2 Sheets-Sheet 2
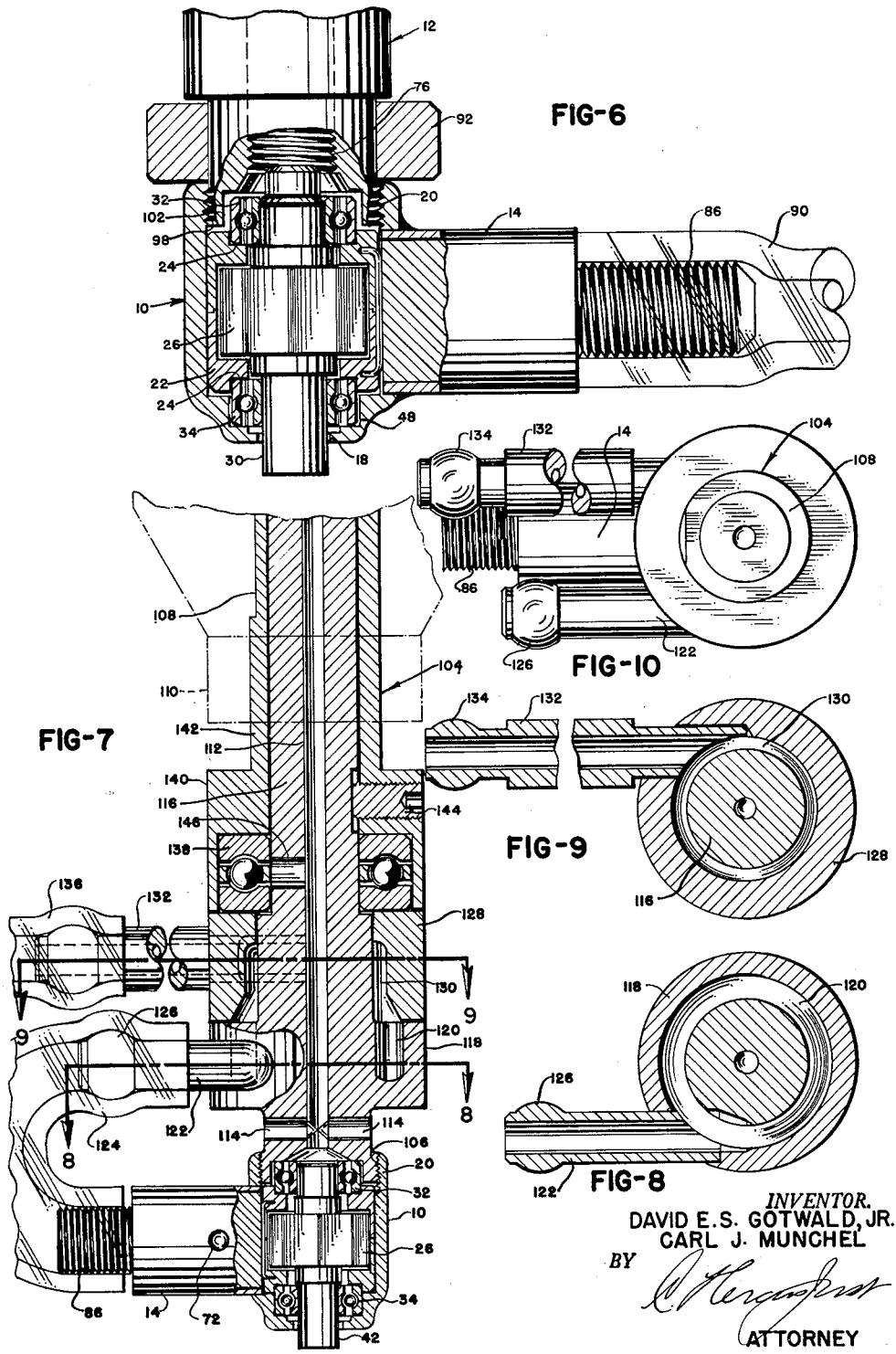
INVENTOR.
DAVID E.S. GOTWALD, JR.
CARL J. MUNCHEL
BY
ATTORNEY

United States Patent Office 3,157,384
Patented Nov. 17, 1964

3,157,384
HIGH SPEED TOOL
David E. S. Gotwald, Jr., and Carl J. Munchel, York, Pa., assignors to The Dentists' Supply Company of New York, York, Pa., a corporation of New York
Original application May 20, 1960, Ser. No. 30,673, now Patent No. 3,077,333, dated Feb. 12, 1963. Divided and this application July 10, 1962, Ser. No. 208,723
3 Claims. (Cl. 253—2)

This application is a division of pending application Serial No. 30,673, filed May 20, 1960, now Patent No. 3,077,333.

This invention relates to improvements in a high speed tool and, more particularly, to a high speed tool of the type in which a tool member is carried by a rotor operated at high speed by a turbine driven by gaseous fluid.

The principal object of the present invention is to provide a high speed tool capable of a wide variety of uses on a large number of different materials to either cut, grind, polish, or otherwise work upon the material, the effectiveness of the action of the tool member, per se, upon such material resulting from high speed rather than pressure.

Another object of the invention is to provide supporting means for the tool or turbine head of the tool assembly for rotation about the axis of the rotor while supported in a machine tool, and also provide adequate means for supplying gaseous fluid, under pressure, to said turbine to drive the same while the turbine head is being rotated, whereby the tool assembly is adapted for jig boring, grinding, and the like.

Details of the foregoing objects and of the invention, as well as other objects thereof, are set forth in the following specification and illustrated in the accompanying drawings comprising a part thereof.

In the drawings:

FIG. 6 is a vertical sectional fragmentary view of the supporting arrangement of the head shown in FIG. 2 and employing a scale similar to that used in FIGS. 4 and 5.

FIG. 7 is a vertical sectional view of another embodiment of supporting means to which the turbine or tool head is connected, certain fragmentary portions of the structure being shown in full side elevation so as to highlight certain details of the structure shown in section.

FIGS. 8 and 9 respectively are horizontal sectional plan views of certain details of the supporting means shown in FIG. 7, as seen respectively on the lines 8—8 and 9—9 of FIG. 7.

FIG. 10 is a top plan view of the supporting means shown in FIG. 7.

Figure 1:
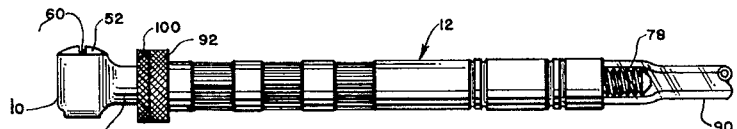
FIG. 1 is a side elevation of one embodiment of elongated supporting means to which a turbine or tool head is connected in one position of attachment to comprise a high speed tool assembly in which the turbine rotor operates about an axis transverse to the longitudinal axis of the supporting means.
Figure 4:
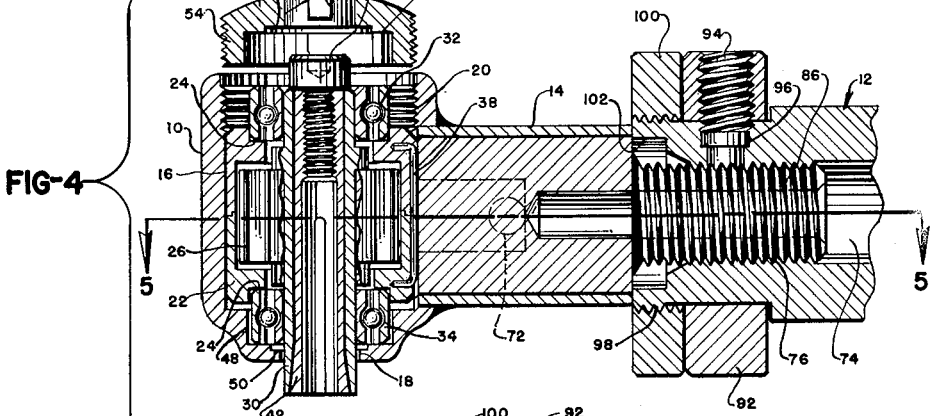
FIG. 4 is a fragmentary vertical sectional view of the head end of the tool assembly shown in FIG. 1, but on a larger scale than in FIG. 1, this view also showing certain components of the head in axially extended relationship.

Referring to the drawings, the embodiment of high speed tool unit illustrated in FIGS. 1 through 6 comprises a turbine or tool head 10 having means thereon to connect the same selectively in two different positions, to one embodiment of supporting means 12 and is the claimed subject matter of parent application Serial No. 30,673. The head 10 has a laterally extending, supporting projection comprising a neck 14. Referring to FIG. 4, in which the head 10 is shown in vertical sectional view and is connected to the supporting means 12 in the same manner as illustrated in FIG. 1, it will be seen that the head 10 has an internal cavity 16 which extends, in an axial direction, through the head 10 and is open at opposite ends. The lower end has an opening 18 and the upper end has an opening 20 which is threaded internally. The cavity 16, preferably, is cylindrical.

Figure 5:
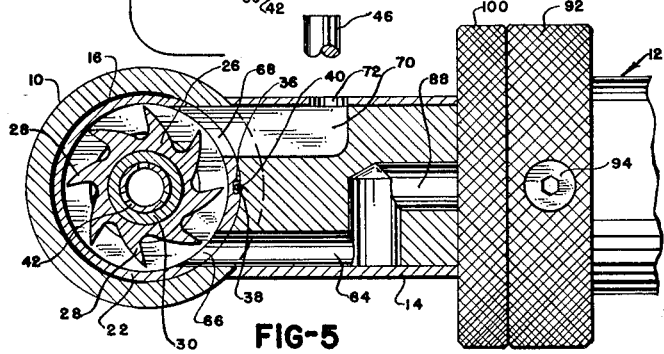
FIG. 5 is a fragmentary horizontal sectional view of the structure shown in FIG. 4, as seen on the line 5—5 of FIG. 4.

Removably mounted within the cavity 16 of head 10 is a casing 22 which comprises two complementary halves somewhat resembling cup-like shells, respectively provided with seats 24 in the outer ends thereof. The open ends of the two shell-like halves of casing 22 abut each other, as clearly shown in FIG. 4, the interior casing 22 receiving the turbine rotor 26 which is provided with, preferably, radial vanes 28, as best shown in FIG. 5.

Extending from opposite ends through turbine rotor 26 is a hollow shaft 30, the opposite ends of which, respectively, are press-fitted through the inner races of upper and lower radial anti-friction bearings 32 and 34. The outer races of said bearings respectively are received within the seats 24 in the opposite ends of casing 22. The assembly comprising casing 22, bearings 32 and 34, and the turbine rotor and shaft 26 and 30 is insertable within and removable from the cavity 16 of the head 10, as a unit and, for convenience, said unit or assembly may be referred to as a cartridge. The side walls of the two shells of casing 22 are provided with axially aligned recesses 36 which receive an elongated, U-shaped key 38. The wall of cavity 16 also is provided with a shallow groove 40 which is complementary to recesses 36 and receives the key 38 for a portion of its thickness, whereby key 38 prevents rotation of casing 22 about the axis of the turbine rotor 26 when the cartridge is mounted within the cavity 16 of head 10.

The hollow shaft 30 receives any suitable chucking means, such as a longitudinally split chuck 42, which is open at the lower end adjacent the opening 18 of head 10, the upper end of chuck 42 being completely cylindrical and internally threaded to receive a clamping screw 44. As is clearly shown in FIG. 4, the lower end of chuck 42, on its exterior, flares outwardly and downwardly and the lower end of the hollow interior of shaft 30 flares in a complementary manner, whereby when the screw 44 is rotated in one direction, the fingers of chuck 42 will be drawn upwardly into the hollow interior of shaft 30 so as to compress the fingers of the chuck about the walls of the shank 46 of a tool member, such as a grinding element, cutting element, polishing or burnishing member, or otherwise, it being intended that the illustration in FIG. 4 of a fragmentary portion of a shank shall suffice to be representative of a wide range of different types and kinds, as well as shapes and sizes of tool members which can be accommodated by the chuck 42.

The lower portion of the cavity 16 within head 10 terminates in an annular seat 48 to receive the outer race of the projecting lower bearing 34 when the cartridge is positioned within the cavity 16, as best shown in FIG. 4. There is also an annular relief space 50 to permit ready rotation of the inner race of the lower radial bearing 34.

The cartridge is maintained in operative position within the cavity 16 by a cap 52 when the head is mounted relative to supporting means 12, as shown in FIG. 1, with the supporting projection 14 detachably connected to the supporting means 12. From FIG. 4, it readily will be seen that the cap 52 has an annular skirt 54 which is externally threaded to be complementary to the threaded interior of opening 20 in the upper end of head 10. The interior of cap 52 also is provided with an annular shoulder 56 which abuts the upper end of the outer race of upper radial bearing 32 when the cap is threaded into the opening 20 and assumes the position shown in FIG. 1. Cap 52 also is provided with an annular clearance space 58 to permit free rotation of the inner race of the upper bearing when the shaft 30 of the turbine rotor 26 is rotating.

Head 52 also is provided with a transverse slot 60 for purposes of receiving an instrument, such as a screwdriver, for purposes of tightening and loosening the cap 52 relative to head 10. Further, the cap 52 is provided with a circular opening 62 to accomodate the head of clamping screw 44 and also permit access to the same, particularly the wrench-receiving socket in the upper end thereof which is engageable by an Allen wrench, or the like, for purposes of tightening and loosening the jaws of the chuck 42 relative to the shank of a tool member.

Extending in a generally longitudinal direction through the supporting projection or neck 14 is an inlet opening 64, the end of which nearest the head 10 is disposed substantially tangentially to the interior of casing 22. Said casing has an inlet opening or port 66 therein and also an exhaust or discharge port 68 which communicates with an exhaust channel 70 in neck 14 that terminates in a lateral exhaust opening 72 through which gaseous fluid is discharged to atmosphere after it has accomplished its work of driving the turbine rotor at high speeds.

The turbine rotor 26 may be of a range of different sizes, for example, from approximately ¼ inch in diameter to 1 inch or more in diameter, depending upon the speed, torque, and other work characteristics which are desired to be developed by the turbine, in accordance with a particular type of work to be performed by the tool member 46 carried by the turbine rotor and chuck 42. Primarily, it is intended that the turbine shall operate at relatively high speeds of the order of between 200,000 and 400,000 r.p.m. or upwards, for example, whereby the operation and effectiveness of the tool member 46 results principally from speed rather than pressure against the surface of an object being worked upon by the tool member 46.

Referring particularly to FIG. 4, it will be seen that the supporting means 12 is provided with an axial opening 74, one end of which has internal threads 76 and the opposite end of which terminates in an exteriorly threaded extension 78 which is hollow and comprises the outer end of axial opening 74 within supporting means 12. From FIGS. 2 and 3, it will be seen that an internally threaded cap piece 80, which has a discharge constricting hole 82 in the outer end thereof, is arranged to be threaded onto the extension 78 for several purposes. One is to clamp the guide member 84 onto the threaded extension 78 and a second is to provide a constricted exhaust opening or port for the outer end of axial opening 74 within supporting means 12. Discharge constricting hole 82 cooperates with other constricting outlets from the turbine chamber to maintain a desired positive operating pressure of gaseous fluid within the interior of head 10, and particularly the interior of casing 22, at all times while the rotor is rotating.

The diameter of the opening 18 in the lower part of head 10 is only very slightly larger than the outer diameter of shaft 30 which, preferably, projects at least to the outer surface of the lower end of head 10, and preferably slightly beyond, as shown in FIG. 4. Further, the opening 62 in cap 52 is only sufficiently larger than the head of clamping screw 44 that relatively slight clearance is disposed therebetween, whereby the clearances at both the upper and lower ends of the head 10 relative to the rotating portions of the turbine rotor and its shaft, as well as the chuck means, provide a relatively constricted outlet for gaseous fluid which is fed to the inlet opening 64 of the supporting neck 14, under adequate pressure to drive the turbine rotor 26 at a desired high speed.

Gaseous fluid, such as air, upon leaving the vanes 28 of the rotor 26, is discharged substantially in opposite axial directions respectively through the annular seats 24 in opposite ends of the casing 22 and the spaces between the inner and outer races of the radial bearings 32 and 34, thereby cooling the bearings. Further, inasmuch as the gaseous fluid which is furnished to the high speed tool, under pressure, likewise preferably contains a predetermined proportion of fine oil mist therein, gaseous fluid passes through the bearings 32 and 34 so as to both lubricate and cool them prior to the gaseous fluid finally being discharged from the head 10 either through the constricted openings in the upper and lower ends of the head 10 or the exhaust opening 72 in supporting neck 14. It has been found, further, that maximum efficiency and performance of the turbine rotor is achieved if there is at all times a certain positive pressure of gaseous fluid maintained within the interior of casing 22, and the size and arrangement of said constricted discharge means are such that adequate positive pressure is maintained at all times within the interior of casing 22 and head 10.

Figure 2:
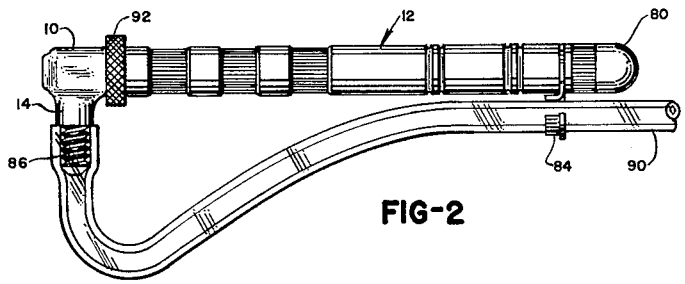
FIG. 2 is a view similar to FIG. 1 but illustrating another position of attachment of the turbine or tool head to the supporting means, whereby the axis of the rotor of said head is coaxial with the longitudinal axis of the supporting means and the conduit for feeding gaseous fluid, under pressure, to the turbine head is connected to the head in a different manner from that illustrated in FIG. 1.
Figure 3:
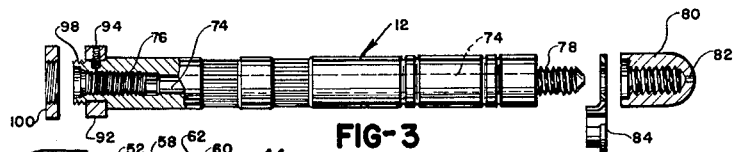
FIG. 3 is a longitudinally exploded view showing the supporting means illustrated in FIGS. 1 and 2, partly in section, and illustrating details of said supporting means.

To enhance the range of uses to which the high speed tool assembly may be put, it will be seen that the head 10 may be mounted in either of two positions relative to supporting means 12, respectively illustrated in FIGS. 1 and 2, as well as, correspondingly, in FIGS. 4 and 6. In the position shown in FIGS. 1 and 4, it will be seen that the axis of the head 10 extends transversely to the axis of elongated, substantially tubular, supporting means 12; whereas in FIGS. 2 and 6, the turbine head 10 is connected to the same end of supporting means 12, as shown in FIGS. 1 and 4, but with the axis of the turbine head 10 extending coaxially of the axis of said supporting means 12. Further, the different supporting arrangements are such, for example, that, when the actual connecting means are arranged in one position of engagement for attachment of the turbine head relative to the supporting means, other connecting means are utilized for purposes such as connecting a flexible tube, for example, to the turbine head so as to form a means for directing gaseous fluid, under pressure, to the turbine head to drive the turbine therein. Hence, dual functions are provided for such connecting means, details of which will now be described.

Supporting neck 14 terminates at its outer end in an externally threaded extension 86 provided with an axial opening extending therethrough which communicates, coaxially, with central inlet opening 88. When the axis of head 10 is transverse to that of supporting means 12, as shown in FIGS. 1 and 4, any suitable conducting means, such as a flexible tube 90, is connected at its delivery end to the threaded extension 78 of supporting means 12 so as to deliver gaseous fluid, under pressure, to the turbine head 10 to drive the turbine thereof.

In order to secure the turbine head against accidental separation from the supporting end of supporting means 12, a collar 92 is formed upon said supporting end of means 12 to receive a set screw 94. The set screw operates against a pressure plug 96, the inner end of which has a face having a configuration complementary to the external threads of extension 86. Hence, when the set screw 94 is threaded inwardly to lock the threaded extension 86 against rotation relative to the internal threads 76 of supporting means 12, the external threads of extension 86 will not be damaged. Further, as will be seen particularly from FIG. 4, the supporting end of supporting means 12 is provided with external threads 98 which are complementary to the internal threads in upper opening 20 of head 10. When the head 10 is positioned upon supporting means 12, as shown in FIGS. 1 and 4, the external threads 98 of means 12, preferably, are protected by a threaded guard ring 100.

The embodiment of the invention shown in FIGS. 1 through 6 is designed, primarily, as a manually operable high speed tool assembly, the turbine head 10 being selectively positionable, as shown either in FIG. 1 or 2, depending upon whether the axis of the turbine head is desired to be transverse to or coaxial with the axis of the supporting means 12. As seen in said figures supporting means 12 is suitably shaped that it might be held in the human hand in a manner similar to that of a pen or pencil. However, this embodiment of the invention is not restricted to manual use inasmuch as the supporting means 12, preferabl being formed from round metal stock, is capable of being held in a suitable machine, such as a jig borer, milling machine, tail stock of a lathe, or otherwise.

Further, it will be seen that when the turbine head 10 is connected to supporting means 12 so that the axis of the head 10 is transverse to the axis of means 12, the threaded extension 86 on supporting neck 14 is threadably received within the supporting end of supporting means 12 and gaseous fluid, under pressure, is fed to the turbine rotor through the inlet opening arrangements in supporting neck 14. However, by removing cap 52 from head 10 and threaded ring 100 from external threads 98 of supporting means 12, the external threads 98 may be threaded within the upper opening 20 in head 10 so as to provide an arrangement such as shown in FIGS. 2 and 6. The supporting end of elongated means 12 is provided with an interior annular space 102 which accommodates the upper end of bearing 32 and the annular inner end of said space abuts against the outer end of the outer race of said upper bearing 32 so as to clamp the same firmly within its seat 24 in the upper end of casing 22.

Further, in regard to the arrangement shown in FIGS. 2 and 6, the threaded extension 86 of neck 14, rather than being threaded into the suporting end of supporting means 12, is connected to one end of flexible tube 90 through which gaseous fluid, under pressure, is fed to the turbine of the head 10, while the axial opening 74 within supporting means 12 functions as a discharge conduit for air exiting through the upper radial bearing 32 incident to cooling and lubricating the same. Under such circumstances, the constricted hole 82 in the outer end of cap piece 80 serves to maintain desired pressure of gaseous fluid within the turbine cavity provided in casing 22 and head 10. The cap piece 80 also clamps guide member 84, for flexible tube 90, to supporting means 12.

The embodiment of supporting means shown in FIGS. 7 through 10 comprises the subject matter to which this divisional application pertains primarily. In this embodiment, it will be seen that the elongated supporting means 104 is provided with connecting means comprising external threads 106 at one end which are complementary to the internally threaded connecting means in the opening 20 in the upper end of turbine head 10, whereby the threads 106 function similarly to the externally threaded connecting means 98 on the supporting end of the supporting means 12 of the embodiment shown in FIGS. 1 through 6. In view of the smaller scale employed in FIG. 7 relative to the details of the interior elements of turbine head 10, attention is directed to FIGS. 4 and 6 for such interior details, due to the larger scale employed in these two latter figures, it being understood that the turbine head 10 substantially is the same in both embodiments of the invention.

The embodiment illustrated in FIGS 7 through 10 primarily is intended to be used, for example, as a jig borer or a jig grinding attachment, the end of the supporting means 104 opposite the threaded end 106 thereof comprising a shank 108 which is received in a chuck 110 or other supporting means of a power tool, such as a milling machine, or the like. Inasmuch as the chuck 110 is representative of a number of different types of supporting means, some of which may be rotatable, for example, the chuck is only fragmentarily illustrated and is shown in phantom. It is to be understood further that the chuck 110 may either be of a stationary or rotatable nature, as well as being movable axially, if desired, either with or without rotation.

In the specific illustration of this embodiment of the invention shown in FIG. 7, the supporting means 104 has an internal bore or passage 112 extending axially throughout the length thereof, principally constituting an exhaust passage for gaseous fluid, under pressure, as discharged from the upper bearing 32 of the turbine head 10. Further, in this embodiment of the suporting means, it is preferred that transverse discharge passages 114 also extend outward from axial passage 112. As in the embodiment shown in FIGS. 1 through 6, the exhaust opening 72 provided in the supporting neck 14 of the turbine head 10, likewise, is used for gaseous exhaust functions, as in the preceding embodiment.

Gaseous fluid, under pressure, is delivered to the turbine head 10 by means which will permit rotation of the head 10 about its axis, such as when the shank 108 of supporting means 104 is held operatively within a rotating chuck 110. Such rotation of the head 10 is in addition to the rotation of the turbine rotor 26 and chuck 42 in the shaft of the rotor. It will be seen from FIG. 7 that the construction of supporting means 104 is such that there is a central cylindrical portion 116 which contains the internal passage 112, the lower end of central portion 116 terminating in an enlarged head 118 having an annular groove extending inward from one face of the head 118, as clearly shown in FIGS. 7 and 8.

Communicating tangentially with head 118 is a delivery nozzle 122. A short length of flexible tubing 124 is positioned upon the outer bulbous end 126 of delivery nozzle 122 and the opposite end thereof is fitted onto the threaded extension 86 of supporting neck 14 of turbine head 10, as clearly shown in FIG. 7. Surrounding the central portion 116 of supporting means 104 adjacent enlarged head 118, is an annular member 128 somewhat resembling a collector ring, said member having an annular groove 130 therein. Extending tangentially into annular member 128 is an inlet tube 132 having a bulbous outer end 134, the inner end of tube 132 communicating with annular groove 130 of member 128. Connected to the outer end 134 of tube 132 is one end of a flexible tube 136 comprising a delivery tube through which gaseous fluid, under pressure, is delivered to the fluid-feeding arrangement for the turbine head 10 when connected to the supporting means 104 of the embodiment shown in FIGS. 7 through 10. From FIGS. 8 through 10 it therefore will be seen that the gaseous fluid enters annular distributor 128 tangentially at one side of the axis of supporting means 104, passes around in circular grooves 120 and 130, and is discharged from head 118 tangentially at the opposite side of the axis of supporting means 104. Hence, no abrupt turns or reversal of direction of movement of the gaseous fluid takes place, thereby producing maximum efficiency in delivering such gaseous fluid, under pressure, to the turbine of head 10.

The annular member 128 preferably is held in slidable abutment against the upper face of enlarged head 118 by a suitable thrust bearing 138 which is mounted within a suitable seat within the enlarged lower end 140 of an outer sleeve 142 which surrounds and is concentric with central cylindrical portion 116 of supporting means 104. Sleeve 142 may be held firmly in assembled relationship with central portion 116 by any suitable means, such as a set screw 144.

If desired, especially to simplify the construction of the composite supporting means 104, the central cylindrical portion 116 and outer sleeve 142 surrounding the same may be made integral, under which circumstance the enlarged head 118 could be threadably connected to the lower end of central portion 116, whereby the annular member 128 could be secured against the thrust bearing 138 by the threaded connection of enlarged head 118 with the threaded lower end of central portion 116, a set screw similar to 144 being employed to hold the enlarged head 118 against rotation upon its supporting means after it has been threaded sufficiently against annular member 128.

The construction of the supporting means shown in the embodiment illustrated in FIGS. 7 through 10 is such that the supporting means and turbine head 10 carried thereby may be rotated at relatively high speeds by a supporting means, such as chuck 110, for example, while the annular member 128 remains substantially stationary. Although the member 128 has only a sliding or wiping fit with the upper surface of enlarged head 118, nevertheless, a slight amount of space, preferably, is provided between such adjacent surfaces, whereby a limited amount of gaseous fluid can escape therebetween and, simultaneously, carry with it lubricating mist sufficient to lubricate said surfaces for movement relative to each other and thereby prevent any frictional binding or other undesired results from occurring between said two surfaces. For purposes of lubricating the thrust bearing 128, one or more outlet holes 146 may be formed in the wall of central cylindrical portion 116 to provide communication between the bearing 138 and the internal passage 112 through which air is discharged after passing through the upper bearing 32 in the turbine head 10 to cool and lubricate the same.

From the foregoing, it will be seen that the embodiment of the present invention shown in FIGS. 7 through 10 provides a high speed tool assembly capable of being connected to and supported by a machine tool, such as a jig borer or jig grinding attachment having supporting means capable of being rotated and otherwise moved selectively to perform various desired operations of which said high speed tool assembly is capable, whereby a tool member carried by the chuck of the turbine of the turbine head of the high speed tool assembly may be operated while the turbine head is being rotated about the axis of the tool. Means are also included to supply gaseous fluid, under pressure, to the turbine head while so supported and moved so as to drive the turbine head and tool member carried thereby.

While the invention has been described and illustrated in its preferred embodiment, it should be understood that the invention is not to be limited to the precise details herein illustrated and described, since the same may be carried out in other ways falling within the scope of the invention as claimed.

We claim:

1. A high speed tool comprising, in combination, a head having a cavity extending axially thereof and openings at opposite ends communicating with said cavity, a neck member projecting laterally from one side of said head transversely to the axis of said head and having a passage extending therethrough opening radially into said head cavity, a turbine rotor having radial vanes thereon and supported within said cavity of said head for rotation about the axis thereof and having means to be connected to a tool extending through one of the openings in one end of said head for rotation by said rotor, connecting means carried by the other end of said head, supporting means having connecting means on one end thereof complementary to and engaging said connecting means on said other end of said head to support said head therefrom with the axis of the rotor coaxial with the axis of said supporting means, a distributor having inlet means for gaseous fluid under pressure and carried by said supporting means to permit rotation of said supporting means about its axis relative to said distributor, said inlet means extending outward from said supporting means, first conduit means connected between said distributor and the passage in said neck member, and second conduit means connectable between a source of gaseous fluid under pressure and the inlet means of said distributor, thereby to deliver gaseous fluid under pressure to said head to drive the turbine rotor therein.

2. The high speed tool set forth in claim 1 further characterized by said distributor having an annular passage extending around the axis of said supporting means and said inlet means for said distributor communicating tangentially with said annular passage at one side of the axis of said supporting means, and passage means comprising an outlet from said supporting means communicating tangentially with said annular passage of said distributor at the opposite side of the axis of said supporting means and extending from said annular passage in the same direction as the direction of movement of gaseous fluid therein, whereby no abrupt angular movement of said gaseous fluid occurs during movement thereof to and from said supporting means, said outlet passage means being connected to said passage in said neck member by said first conduit means aforesaid.

3. The high speed tool set forth in claim 2 further characterized by the neck member of said head having a delivery passage therein entering the turbine cavity of said head tangentially, and said first conduit means between said distributor and neck member being curved and connected at one end to the tangential outlet of said supporting means and at the other end to said tangential delivery passage of said neck member, whereby there is smooth flow of gaseous fluid from the inlet means of said distributor to said turbine rotor.

References Cited in the file of this patent

UNITED STATES PATENTS

| | | |
|---|---|---|
| 2,648,939 | Zelik et al. | Aug. 18, 1953 |
| 3,053,503 | Kern | Sept. 11, 1962 |